(12) United States Patent
Park

(10) Patent No.: US 8,118,135 B2
(45) Date of Patent: Feb. 21, 2012

(54) PHOTOVOLTAIC SOUNDPROOF WALL

(76) Inventor: Jae Sung Park, Daegu (KR)

( * ) Notice: Subject to any disclaimer, the term of this patent is extended or adjusted under 35 U.S.C. 154(b) by 0 days.

(21) Appl. No.: 12/856,881

(22) Filed: Aug. 16, 2010

(65) Prior Publication Data

US 2011/0048845 A1 Mar. 3, 2011

(30) Foreign Application Priority Data

Sep. 3, 2009 (KR) .......................... 10-2009-0082950

(51) Int. Cl.
*B64F 1/26* (2006.01)
*F01N 5/00* (2006.01)
*F24J 2/38* (2006.01)
*F24J 2/40* (2006.01)
*H01L 31/00* (2006.01)
*H01L 31/042* (2006.01)

(52) U.S. Cl. ........ 181/210; 126/585; 126/607; 136/246; 136/259; 181/211

(58) Field of Classification Search .................. 181/210, 181/211; 126/607, 585
See application file for complete search history.

(56) References Cited

U.S. PATENT DOCUMENTS

| | | | | | |
|---|---|---|---|---|---|
| 4,082,947 | A | * | 4/1978 | Haywood et al. | 250/203.4 |
| 4,153,038 | A | * | 5/1979 | McDonald | 126/579 |
| 4,297,521 | A | * | 10/1981 | Johnson | 136/248 |
| 4,351,320 | A | * | 9/1982 | Tetirick | 126/607 |
| 4,475,536 | A | * | 10/1984 | Dame | 126/585 |
| 4,687,923 | A | * | 8/1987 | Bauck | 250/208.2 |
| 5,741,369 | A | * | 4/1998 | Yamamura et al. | 136/251 |
| 7,622,666 | B2 | * | 11/2009 | Hines | 136/246 |
| 2002/0179138 | A1 | * | 12/2002 | Lawheed | 136/246 |
| 2007/0070531 | A1 | * | 3/2007 | Lu | 359/851 |
| 2009/0064994 | A1 | * | 3/2009 | Weatherby et al. | 126/700 |
| 2009/0308377 | A1 | * | 12/2009 | Kleinwaechter | 126/605 |

FOREIGN PATENT DOCUMENTS

| | | | |
|---|---|---|---|
| JP | 09-209315 | | 8/1997 |
| JP | 09209315 A | * | 8/1997 |
| KR | 10-0880921 | | 1/2009 |
| KR | 880921 B1 | * | 2/2009 |
| KR | 2009081359 A | * | 7/2009 |
| KR | 933575 B1 | * | 12/2009 |
| KR | 2010000810 A | * | 1/2010 |

* cited by examiner

*Primary Examiner* — Elvin G Enad
*Assistant Examiner* — Christina Russell
(74) *Attorney, Agent, or Firm* — Lowe Hauptman Ham & Berner, LLP

(57) ABSTRACT

The present invention relates to a photovoltaic soundproof wall having a plurality of soundproof members each formed by surrounding the edge portions of two transparent sheets with a main frame and a plurality of posts adapted to mount the plurality of soundproof members therebetween, the photovoltaic soundproof wall including: a subframe disposed inside the main frame; a motor disposed inside the subframe for rotating a drive shaft rotatably mounted inside the subframe; a power transmission unit adapted to transmit the rotary force of the motor; a plurality of slats spaced apart from each other vertically between the two transparent sheets in such a manner as to be moved collectively by the power transmitted from the power transmission unit; and a plurality of solar cells attached to the top surface of each of the plurality of slats.

18 Claims, 20 Drawing Sheets

PHOTOVOLTAIC SOUNDPROOF WALL

BACKGROUND OF THE INVENTION

1. Field of the Invention

The present invention relates to soundproof walls installed to provide the reduction of road traffic noises to the outside environments, and more particularly, to a photovoltaic soundproof wall that has functions of reducing road traffic noises and easily producing electricity therefrom.

2. Background of the Related Art

Generally, traffic noises on roads are high, and so as to reduce the road traffic noises, thus, soundproof walls are installed along both sides of the road, thereby preventing the road traffic noises from being transferred to the outside.

Conventional soundproof walls, for example, are formed of relatively thick panels capable of efficiently reducing road traffic noises therefrom, but the formation of the relatively thick panels fails to allow the outside appearance of the road to be seen by the occupants of the vehicle.

According to another example of the conventional soundproof walls, further, a plurality of H-beam posts having an H-shaped section are equally spaced apart from one another along the road sides, and a plurality of soundproof members are installed between the adjacent posts. Each of the soundproof members is formed by surrounding the edge portions of a thin single sheet like a Lexan sheet or acrylic sheet with a main frame.

In this case, the outside appearance from the road is seen easily by the excellent clarity of the soundproof members, but since the thicknesses of the soundproof members are substantially low, the conventional soundproof walls do not provide high soundproof effects.

Especially, a lighting device is mounted on the soundproof wall, but in this case, electricity should be brought into the lighting device from the outside.

To solve the above-mentioned inconveniences, thus, there are proposed soundproof walls with a photovoltaic generation device mounted thereon for supplying electricity to the lighting device mounted on the soundproof wall or around the soundproof wall, which are disclosed in Korean Application Nos. 10-2007-0074233, 10-2007-0077373, and 10-2008-0088689 and Korean Utility Model Application No. 20-2006-0024038.

According to the above-mentioned conventional arts, since the photovoltaic generation device is coupled on the top portions or front and rear surfaces of the soundproof walls, solar cells as the parts of the photovoltaic generation device are exposed to the outside. As a result, the generation efficiencies of the solar cells are decreased by the dust generated from the road, and further, the solar cells exposed to the outside are rapidly eroded and damaged.

According to the conventional arts, additionally, a unit for tracking solar positions is mounted on the photovoltaic generation device so as to increase the generation efficiencies of the solar cells, but the entire configuration becomes very complicated by the addition of the unit for tracking the solar positions. Moreover, existing solar cell modules cannot be installed in vertical spaces, and because of the limitation of the installation area of the soundproof walls, the existing solar cell modules are very dangerous, in view of their shape, in their installation.

SUMMARY OF THE INVENTION

Accordingly, the present invention has been made in view of the above-mentioned problems occurring in the prior art, and it is an object of the present invention to provide a photovoltaic soundproof wall that is configured to have a device for receiving solar energy to generate electricity therefrom mounted at the inside thereof, thereby sensing the quantity of electricity generated to permit solar cells to be positioned to an optimal generation state, whereby the reduction of road traffic noises and the easy production of electricity can be achieved, and with the development of new recycling energy, the reduction of the emission quantity of $CO_2$ can be achieved.

It is another object of the present invention to provide a photovoltaic soundproof wall that is capable of sensing an azimuth angle in a front direction of solar cells to allow angles of slats to which the solar cells are attached to be easily adjusted to an optimal state at a given time.

To accomplish the above objects, according to the present invention, there is provided a photovoltaic soundproof wall having a plurality of soundproof members each formed by surrounding the edge portions of two transparent sheets with a main frame and a plurality of posts installed on ground in such a manner as to be equally spaced apart from one another for mounting the plurality of soundproof members therebetween, the photovoltaic soundproof wall including: a sub-frame disposed inside the main frame of each of the plurality of soundproof members; a motor disposed inside the sub-frame for rotating a drive shaft rotatably mounted inside the subframe; a power transmission unit adapted to transmit the rotary force of the motor; a plurality of slats spaced apart from each other vertically between the two transparent sheets in such a manner as to be moved collectively by the power transmitted from the power transmission unit; and a plurality of solar cells attached to the top surface of each of the plurality of slats.

According to the present invention, the photovoltaic soundproof wall further includes a plurality of generation quantity-measuring sensors mounted correspondingly at the insides of the plurality of soundproof members to sense the quantities of electricity generated from the plurality of solar cells, and a plurality of controllers mounted correspondingly at the insides of the plurality of soundproof members to adjust the angles of the slats through the control of the motors disposed at the insides of the plurality of soundproof members. Alternatively, one generation quantity-measuring sensor is mounted to sense the quantities of electricity generated from all of the plurality of solar cells, and one controller is mounted to adjust the angles of the slats through the control of the motors disposed at the insides of the soundproof members, wherein the controller receives the signals sensed by the generation quantity-measuring sensor and controls the motors collectively.

Preferably, the photovoltaic soundproof wall further includes a plurality of azimuth angle sensors mounted at the insides or outsides of the soundproof members or the posts to sense the front directions of the photovoltaic soundproof wall on which the solar energy is radiated, and a plurality of controllers adapted to control the motors to allow the angles of the slats to be adjusted by given time sequences in accordance with the azimuth angles sensed by the azimuth angle sensors.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a photovoltaic soundproof wall according to the present invention will be in detail given with reference to the attached drawings.

Figure 1:
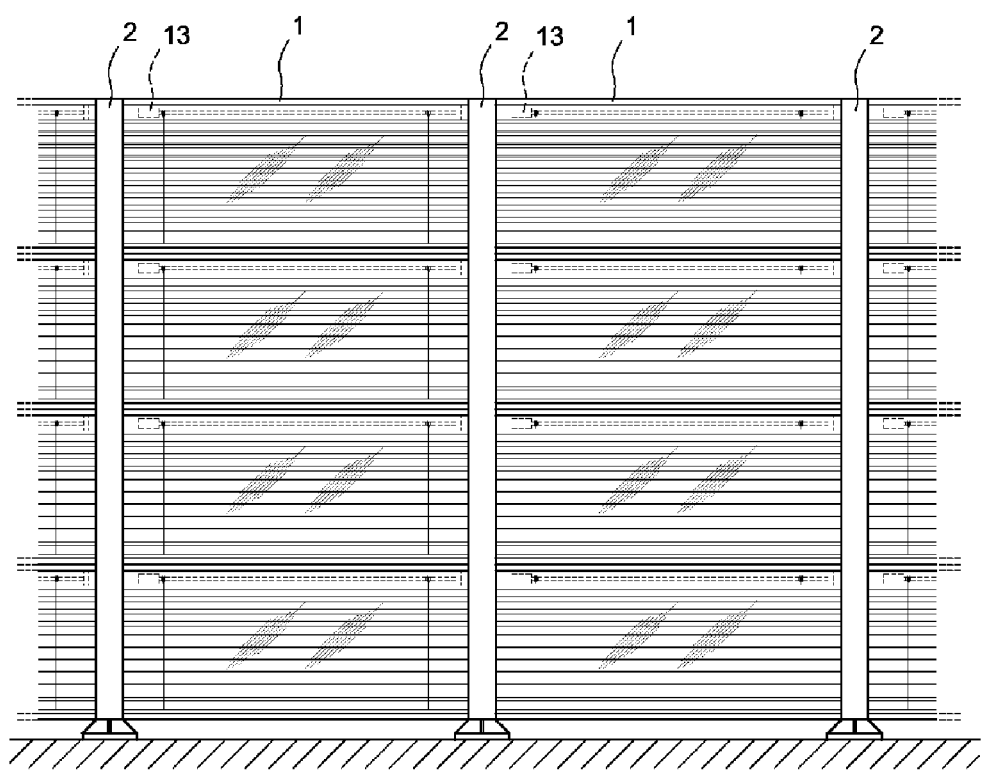
FIG. 1 is a front view showing a portion of a photovoltaic soundproof wall according to one embodiment of the present invention.
Figure 2:
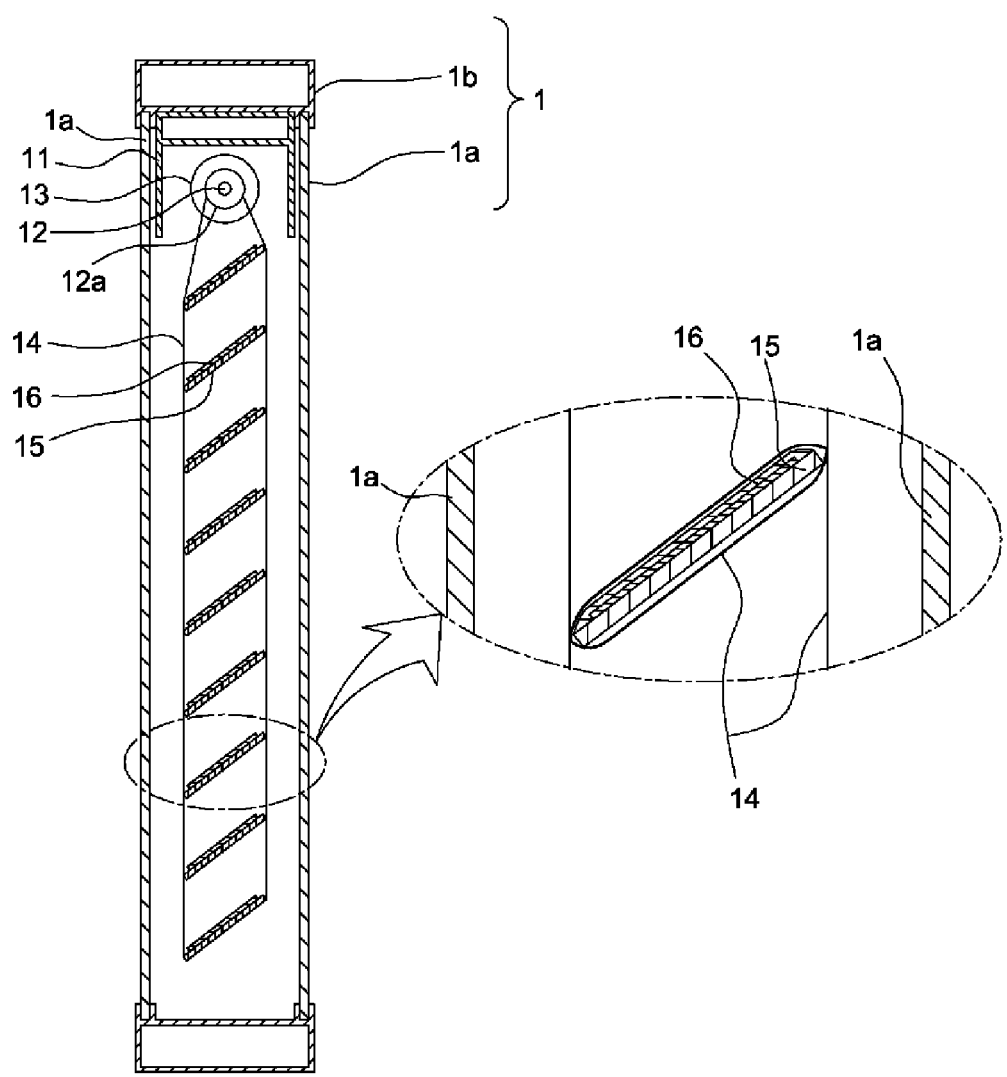
FIG. 2 is a sectional view showing a soundproof member adopted in the photovoltaic soundproof wall according to one embodiment of the present invention.

FIGS. 1 and 2 show a photovoltaic soundproof wall according to one preferred embodiment of the present invention, which is configured to have a plurality of soundproof members 1 each formed by surrounding the edge portions of two transparent sheets 1a with a main frame 1b and a plurality of posts 2 installed on ground in such a manner as to be equally spaced apart from one another for mounting the plurality of soundproof members 1 therebetween.

According to the present invention, the photovoltaic soundproof wall further includes a device for generating solar energy, and thus, a subframe 11 is mounted at the inside upper portion of the main frame 1b. A motor 13 is mounted at the inside of the subframe 11 for rotating a drive shaft 12, and as the motor 13 and the drive shaft 12 are activated, two slat drive cords 14, a plurality of slats 15 and a plurality of solar cells 16 are moved forwardly and backwardly. Therefore, the subframe 11, the motor 13, the slat drive cords 14, the plurality of slats 15 and the plurality of solar cells 16 are mounted at the interior of each of the plurality of soundproof members 1.

The motor 13 is mounted at the inside of the subframe 11 and rotates the drive shaft 12 rotatably disposed at the inside of the subframe 11.

A plurality of drums 12a are mounted spaced apart from each other along the drive shaft 12, and the slat drive cords 14 are formed of a substantially thin elongated member like string, wire, rope, and so on. The top end portions of the slat drive cords 14 are wound on and unwound from the plurality of drums 12a in opposite directions to each other. That is, when the top end portion of one side slat drive cord 14 is wound on the corresponding drum 12a, the top end portion of the other side slat drive cord 14 is unwound from the corresponding drum 12a, such that the plurality of slats 15 connected to the slat drive cords 14 is moved in forward and backward directions as shown in FIG. 1 or moved in left and right directions as shown in FIG. 2.

Accordingly, a power transmission unit in the photovoltaic soundproof wall according to the present invention includes the plurality of drums 12a mounted along the drive shaft 12 and the two slat drive cords 14 moving the plurality of slats 15 collectively. The plurality of slats 15 is surrounded by the two slat drive cords 14, while the top end portions of the two slat drive cords 14 are being wounded on the drums 12a.

The slats 15 are supportedly rotated by means of the slat drive cords 14. That is, as the motor 13 is activated, the slat drive cords 14 are operated by means of the drums 12a, and the slats 15 are moved in forward and backward directions.

The solar cells 16 are attached to the top surface of each slat 15 so as to convert solar energy into electricity. As shown in FIG. 2, a transparent synthetic resin or adhesive (not shown in the drawing) is applied on the top surfaces of the slats 15, and the solar cells 16 attached to each slat 15 are connected serially, in parallel, or serially and in parallel.

Since the subframe 11, the motor 13, the slat drive cords 14, the slats 15 and the solar cells 16 are mounted at the inside of each soundproof member 1, the photovoltaic soundproof wall according to the present invention should have the plurality of subframes 11, the plurality of motors 13, the plurality of slat drive cords 14, the plurality of slats 15 and the plurality of solar cells 16.

Figure 3:
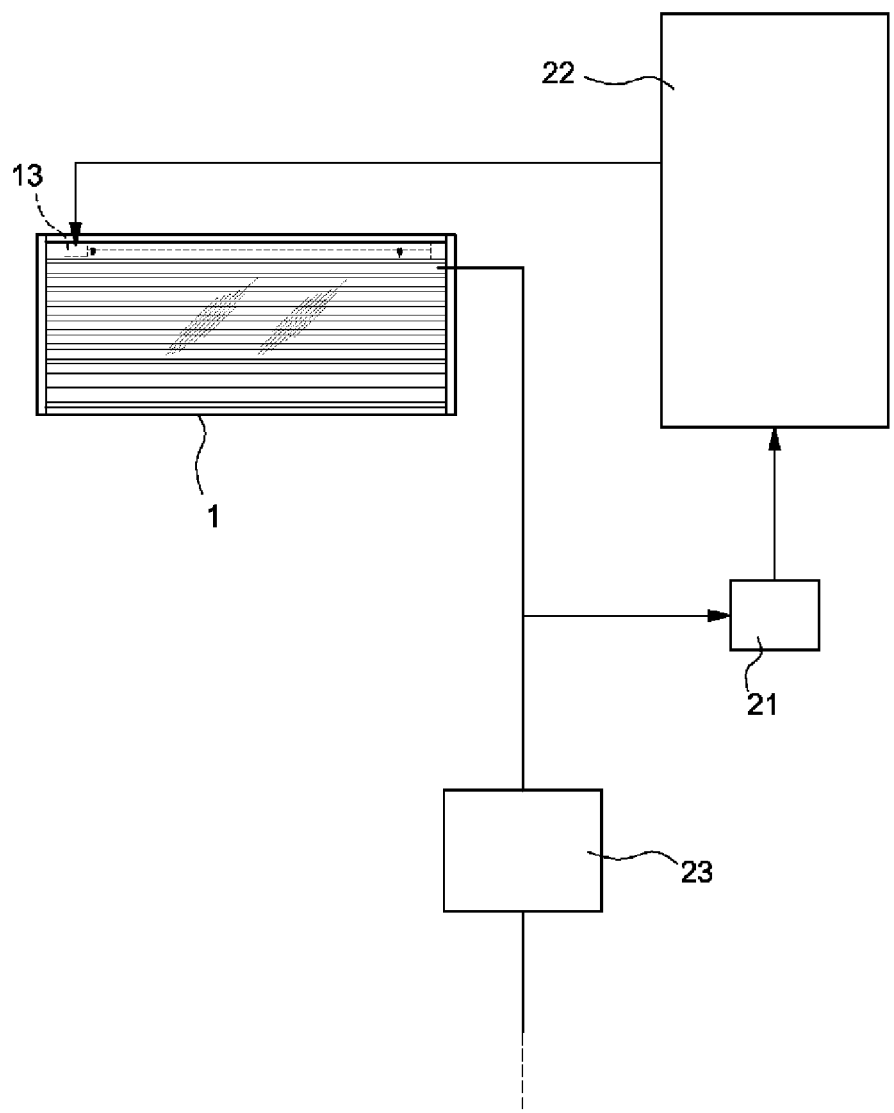
FIG. 3 is a perspective view showing a configuration of one soundproof member of a photovoltaic soundproof wall according to another embodiment of the present invention.

As shown in FIG. 3, a generation quantity-measuring sensor 21, which is adapted to sense the electricity converted by the solar cells 16, is mounted at the inside of each soundproof member 1, and a controller 22 which is adapted to adjust the angles of the slats 15 and the solar cells 16 by controlling the motor 13, is mounted at the inside of each soundproof member 1.

As shown in FIGS. 3 to 6, the generation quantity-measuring sensor 21 and the controller 22 are installed at the outsides of the soundproof members 1, but of course, they may be installed at the inside of the subframe 11 or at the inside of the main frame 1b of each soundproof member 1.

That is, the sizes of the generation quantity-measuring sensor 21 and the controller 22 are small, and they can be installed on ground or at the outside of the photovoltaic soundproof wall in the state of being mounted into a box, which is not shown in the drawings.

The generation quantity-measuring sensor 21 and the controller 22 are mounted at the inside of each soundproof member 1, thereby controlling the motors 13 of the plurality of soundproof members 1 individually.

Figure 4:
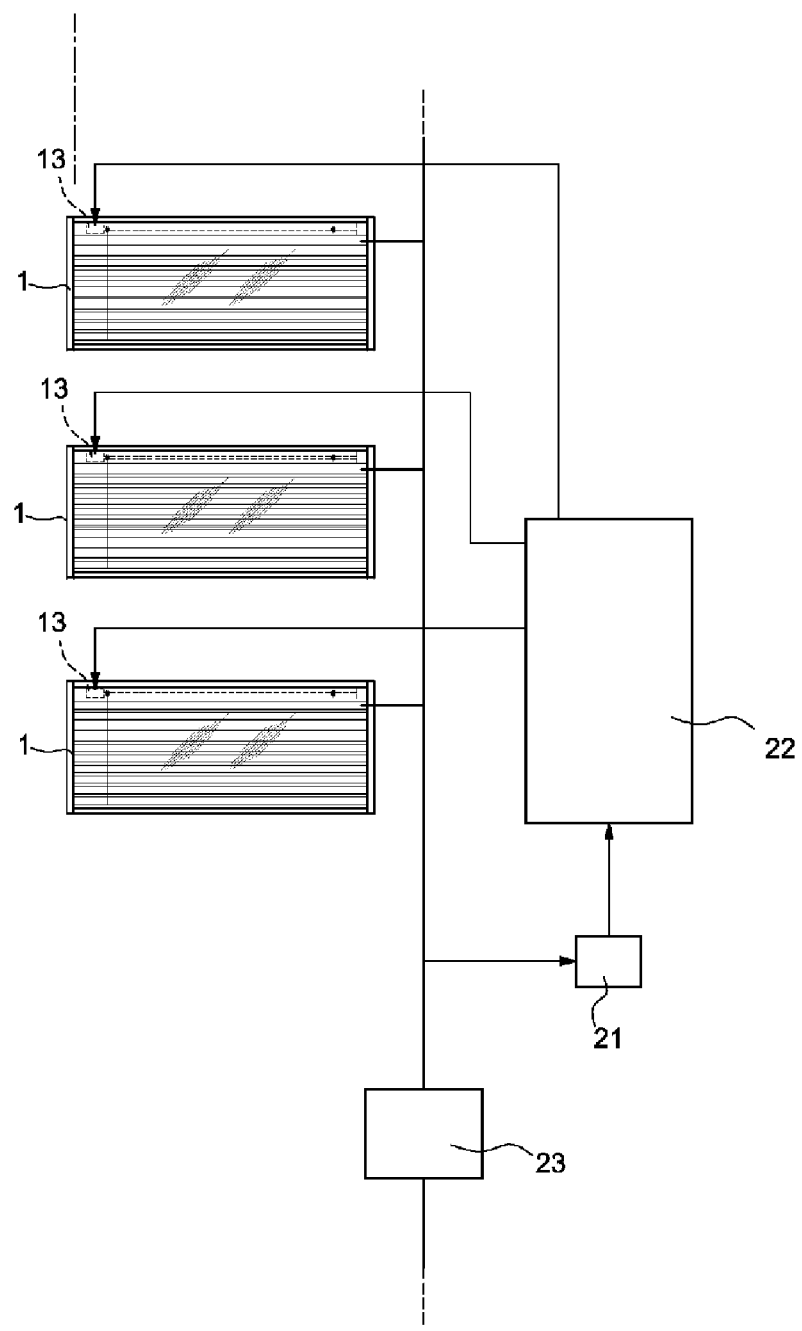
FIGS. 4 to 6 are perspective views showing various configurations of the soundproof members of a photovoltaic soundproof wall according to still another embodiment of the present invention.

As shown in FIG. 4, one generation quantity-measuring sensor 21 and one controller 22 are installed to control all of the motors 13 mounted on the plurality of soundproof members 1 of the photovoltaic soundproof wall, collectively.

In other words, one generation quantity-measuring sensor 21 senses the electricity converted by the solar cells 16 mounted at the insides of the plurality of soundproof members 1 of the photovoltaic soundproof wall, and one controller 22 controls the motors 13 collectively to adjust the angles of the slats 15. That is, the controller 22 receives the sensing signal of the generation quantity-measuring sensor 21 and controls the motors 13 collectively.

Figure 5:
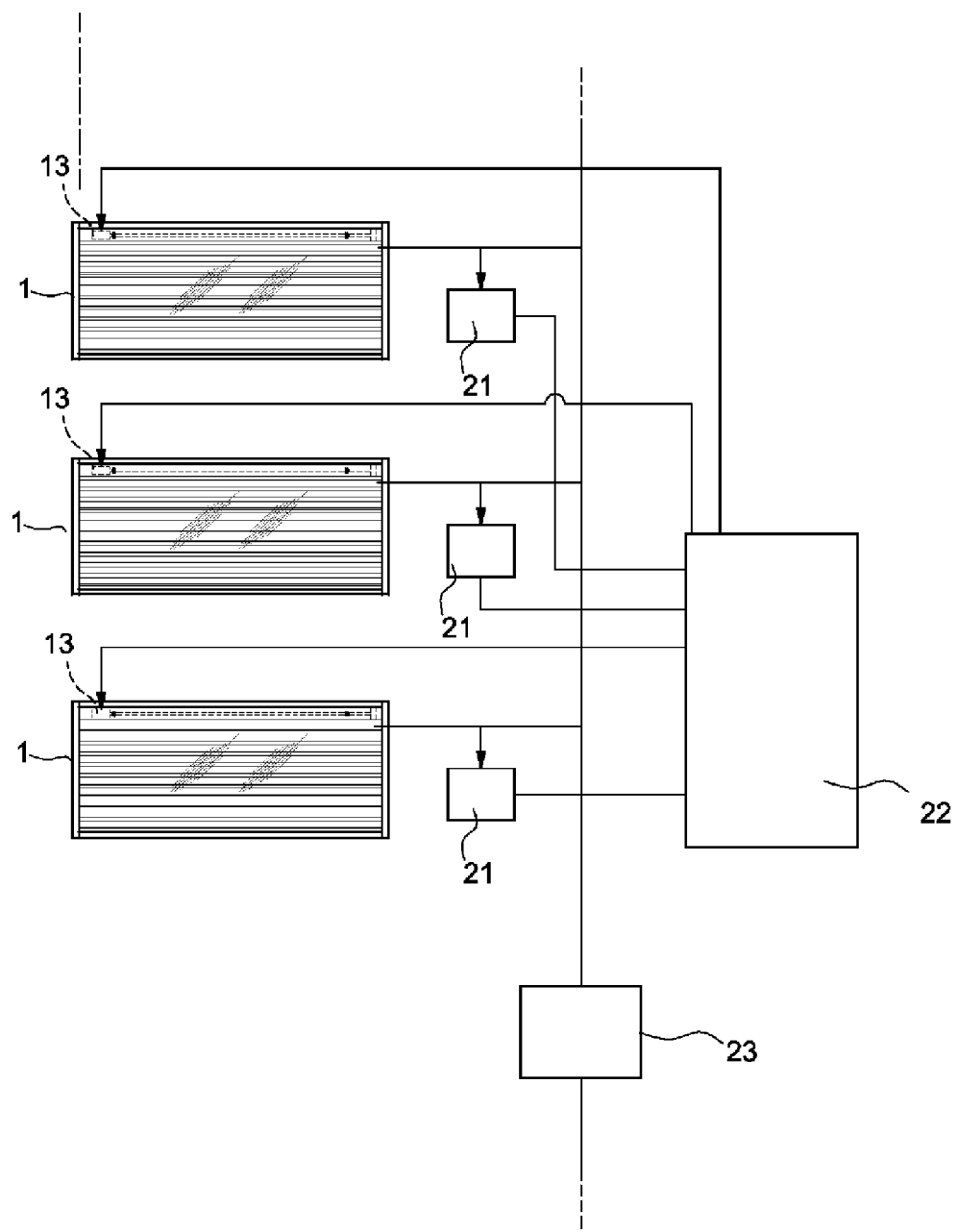

On the other hand, as shown in FIG. 5, one controller 22 receives the sensing signals of the plurality of generation quantity-measuring sensors 21 and controls the motors 13 individually.

In this case, the plurality of generation quantity-measuring sensors 21, which sense the electricity produced continuously or at predetermined time intervals by the plurality of solar cells 16, are mounted correspondingly at the insides of the plurality of soundproof members 1, and one controller 22 receives the sensing signals of the plurality of generation quantity-measuring sensors 21 and controls the motors 13 individually.

After the controller 22 has received the sensing signals of the plurality of generation quantity-measuring sensors 21, the controller 22 calculates a maximum value of generation quantity and controls the motors 13 by time sequences or collectively, thereby adjusting the angles of the slats 15 individually or collectively.

On the other hand, the electricity can be supplied to electrical and electronic equipment (which is not shown) like lighting devices installed on the photovoltaic soundproof wall or street lamps installed at the outside of the photovoltaic soundproof wall. In this case, since the electrical and electronic equipment is operated with alternating current, there is a need to convert the direct current produced by the solar cells 16 into alternating current.

Thus, as shown in FIGS. 3 to 6, an inverter 23 is adapted to convert the direct current produced from the solar cells 16 into alternating current, so as to supply the alternating current to the electrical and electronic equipment installed on the photovoltaic soundproof wall or at the outside of the photovoltaic soundproof wall.

In addition to the parts as shown in FIGS. 1 and 2, the inverter may be provided to convert the direct current produced from the solar cells 16 into alternating current and to supply the alternating current to an electric power system.

Figure 6:
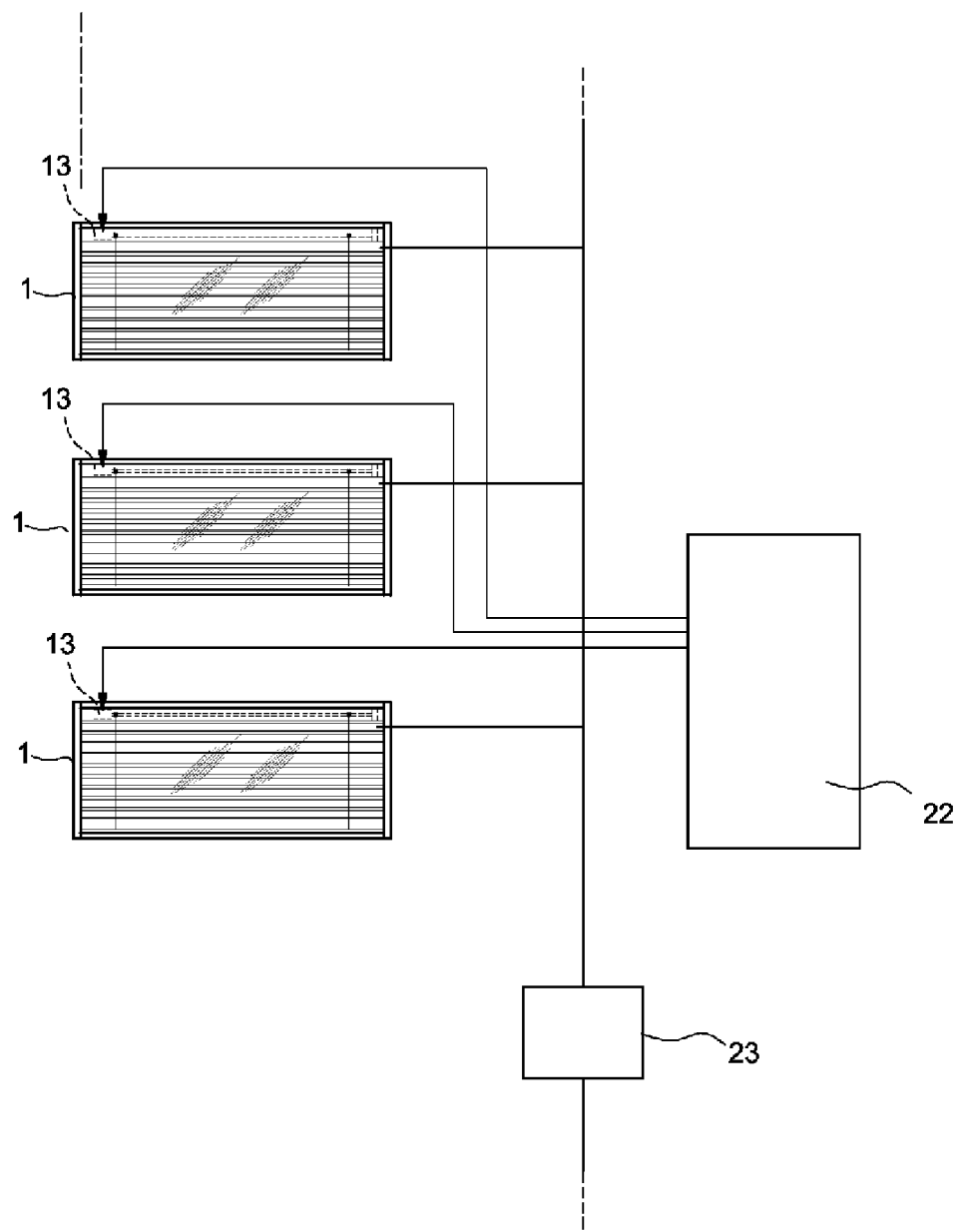
Figure 7:
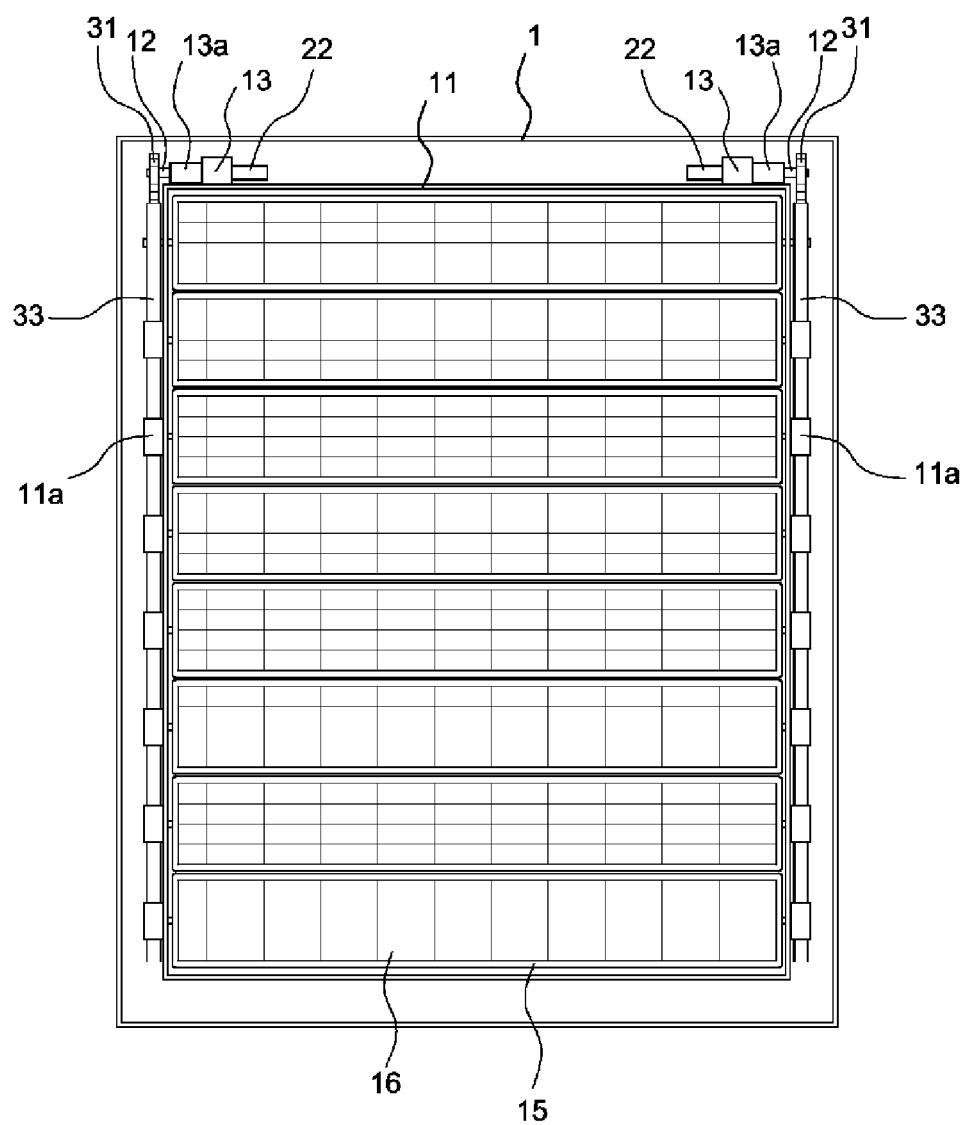
FIGS. 7 to 12 are perspective views showing various examples of a power transmission unit adopted in the photovoltaic soundproof wall according to the present invention.

As shown in FIG. 6, of course, the motor 13 is controlled with only the controller 22, without having any generation quantity-measuring sensor 21. In this case, the optimal angles of the solar cells 16 are programmed in the controller 22 by given time sequences, season sequences, and installation areas, and the motors 14 mounted at the insides of the plurality of soundproof members 1 are controlled individually or collectively to adjust the angles of the solar cells.

Since the subframe 11, the motor 13, the slat drive cords 14, the slats 15 and the solar cells 16 are mounted at the inside of each of the plurality of soundproof members 1, the photovoltaic soundproof wall according to the present invention has the same outer appearance as the conventional soundproof walls, but the present invention further includes a device for converting the solar energy into electricity.

According to the present invention, especially, the plurality of solar cells 16 produce the electricity from the solar energy passing through the transparent sheets 1a, and the generation efficiency of the plurality of solar cells 16 can be easily maintained just by cleaning the dust covered on the external surfaces of the transparent sheets 1a.

If the solar energy is passed through the transparent sheets 1a and reaches the solar cells 16, electricity is produced from the solar cells 16 and the controller 22 is operated. As a result, the motor 13 is activated, and the drive shaft 12 is rotated by the activation of the motor 13, thereby allowing the positions of the slats 15 to be varied.

At this time, the maximum value of the quantity of electricity generated from the solar cells 16 is sensed by means of the generation quantity-measuring sensor 21, and thus, if the sensed signal is sent to the controller 22, the motor 13 is controlled by the controller 22, thereby allowing the slats 15 and the solar cells 16 to be varied to positions where a maximum quantity of electricity can be generated from the solar cells 16.

If the motor 13 is continuously activated by the controller 22, further, the life term of the motor 13 can be shortened. Thus, the controller 22 can control the motor 13 by time sequences with the data calculated by the positions of the slats 15 and the solar cells 16 by given time sequences. That is, given programs wherein the optimal angles of the solar cells 16 are obtained by given time sequences, season sequences, and installation areas are stored in the controller 22, and in accordance with the programs stored in the controller 22, the motors 13 mounted at the insides of the soundproof members 1 are controlled individually or collectively, thereby adjusting the angles of the solar cells 16.

According to the power transmission unit in the photovoltaic soundproof wall, of course, the plurality of drums 12a are disposed spaced apart from each other around the drive shaft 12 rotated by the motor 13, and the top end portions of the slat drive cords 14 supportingly rotating the plurality of slats spaced apart vertically from each other are wound on the plurality of drums 12a.

With another type of power transmission unit in the photovoltaic soundproof wall, of course, the plurality of slats 15 can be moved.

As shown in FIGS. 7 to 12, for example, according to the power transmission unit, a decelerator 13a, which is adapted to reduce the number of rotations of the motor 13, is coupled to the drive shaft 12, and a pinion 31 is mounted along the end portion of the drive shaft 12. A plurality of driven gears 32 arranged along the side surface of the subframe 11 are mounted along the end portions of a plurality of slat shafts 15a mounted passed through the centers of the plurality of slats 15, and two racks 33 engage with the pinion 31 and the plurality of driven gears 32, while placing the pinion 31 and the plurality of driven gears 32 therebetween. The two racks 33 are movable vertically by means of a plurality of guides 11a mounted along the side surface of the subframe 11.

According to the power transmission unit having the above-mentioned structure, the slat shafts 15a are fixed correspondingly to the slats 15, and the driven gears 32 are fixed correspondingly to the slat shafts 15, such that the slat shafts 15a and the driven gears 32 are rotated together. After that, the racks 33 are moved vertically by the rotation of the pinion 31 to rotate the driven gears 32, thereby rotating the slat shafts 15a and the slats 15.

As shown in FIGS. 13 to 18, still another type of power transmission unit is provided wherein the decelerator 13a adapted to reduce the number of rotations of the motor 13 is coupled to the drive shaft 12, and a drive gear 41 is mounted along the end portion of the drive shaft 12. An idle gear 42 is mounted at the top portion of the side surface of the subframe 11, and a main link 43 is mounted on the idle gear 42. A plurality of sublinks 44 are mounted along the end portions of the slat shafts 15a mounted passed through the centers of the slats 15, and a plurality of vertical links 45 are coupled by means of hinges to the both end portions of each of one main link 43 and the plurality of sublinks 44.

According to the power transmission unit having the above-mentioned structure, the main link 43 is fixed to the idle gear 42, and the slat shafts 15a are fixed to the slats 15. Further, the sublinks 44 are fixed to the slat shafts 15, and thus, the idle gear 42 and the main link 43 are rotated by the rotation of the drive gear 41. As the main link 43 is rotated, next, the plurality of vertical links 45 is moved to rotate the sublinks 44, the slat shafts 15a and the slats 15, together.

Figure 8:
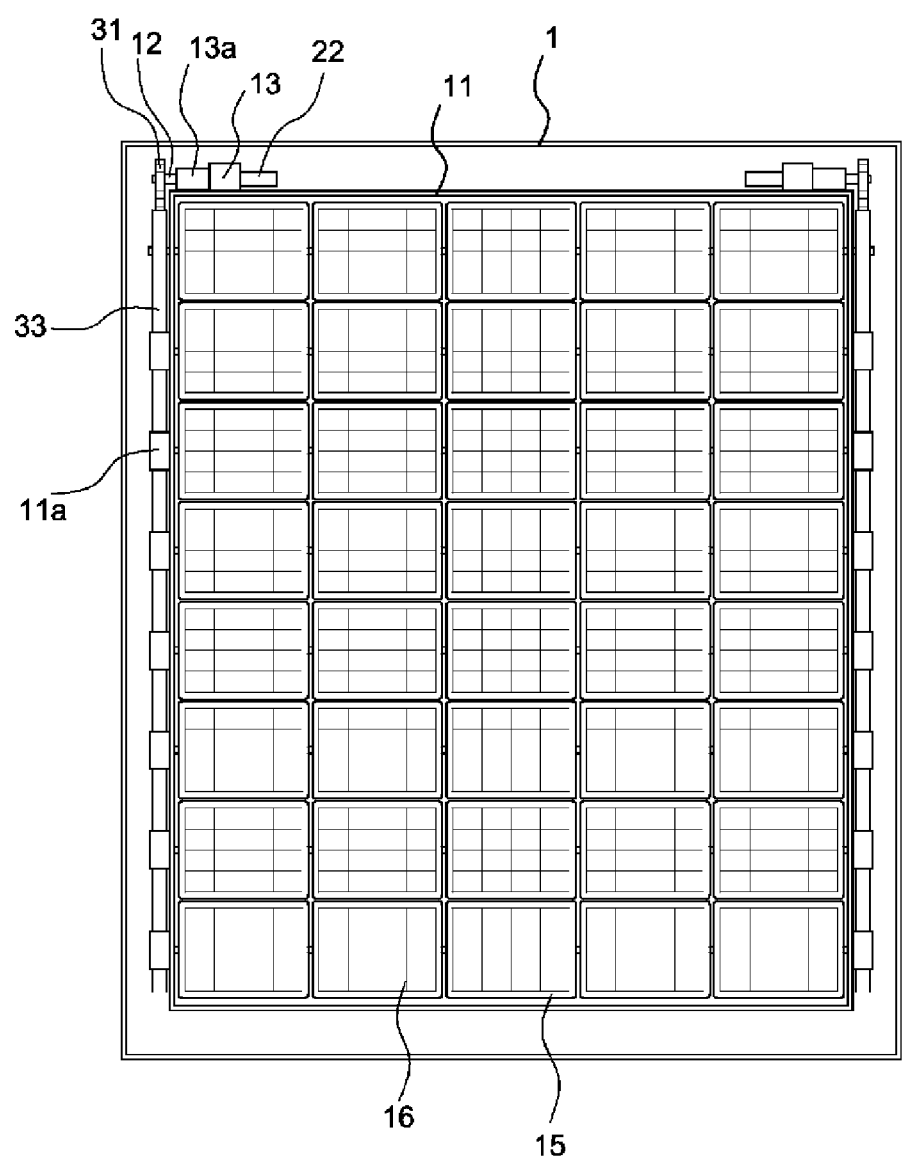
Figure 9:
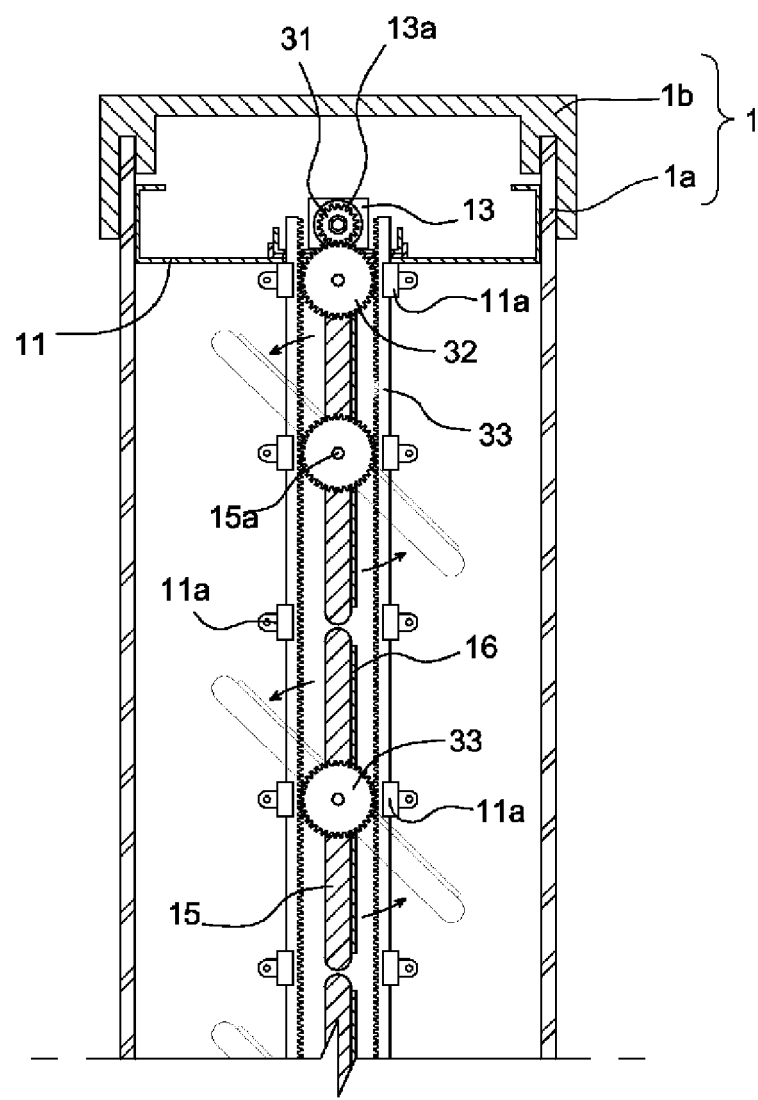
Figure 10:
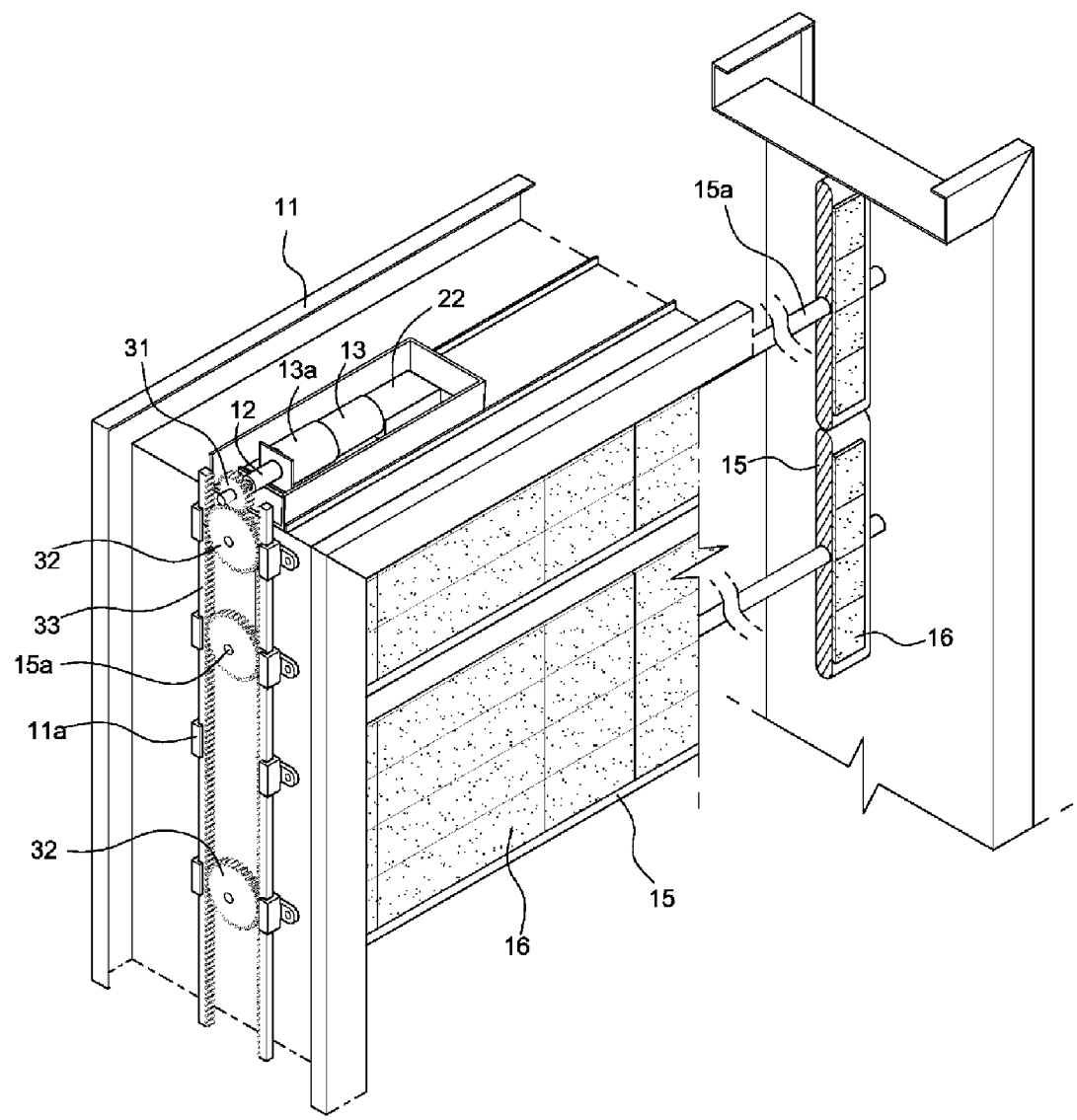
Figure 11:
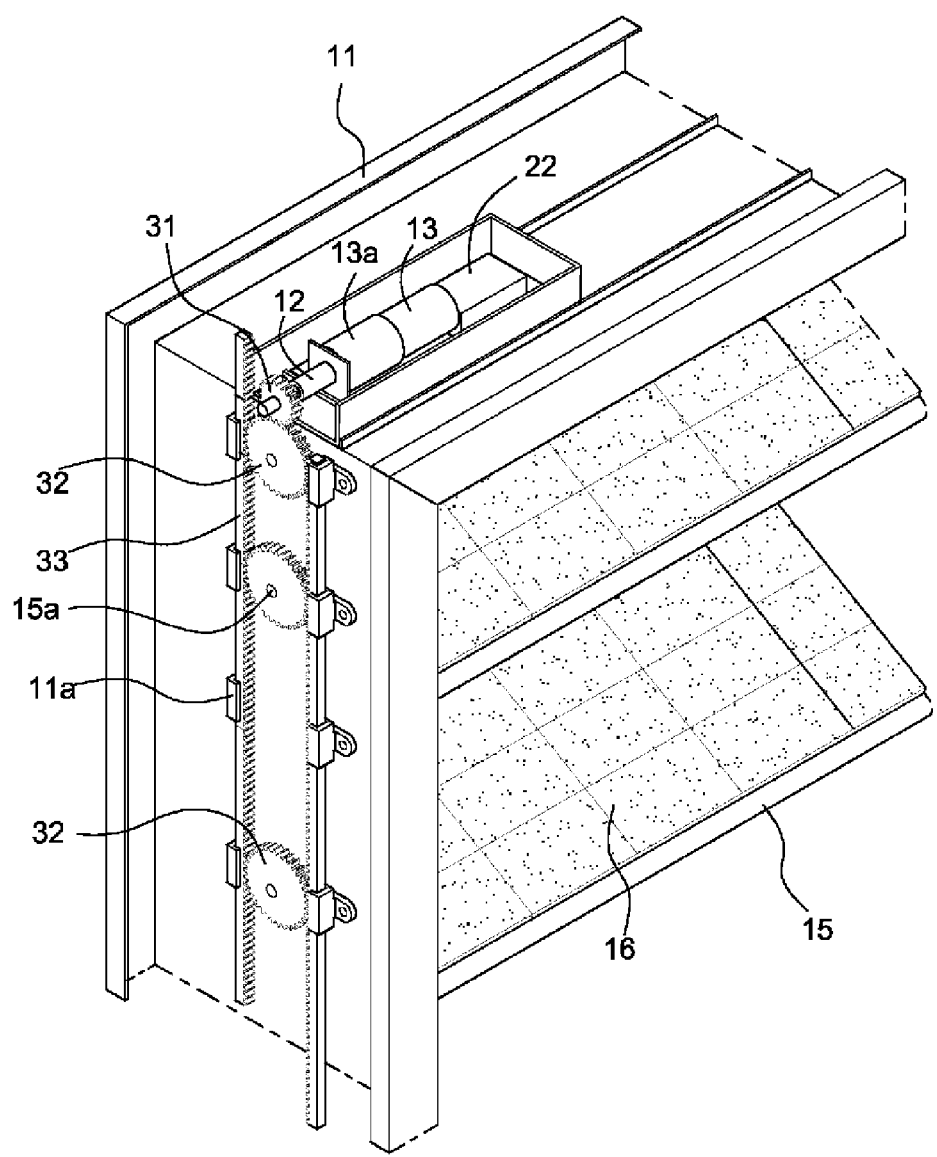
Figure 12:
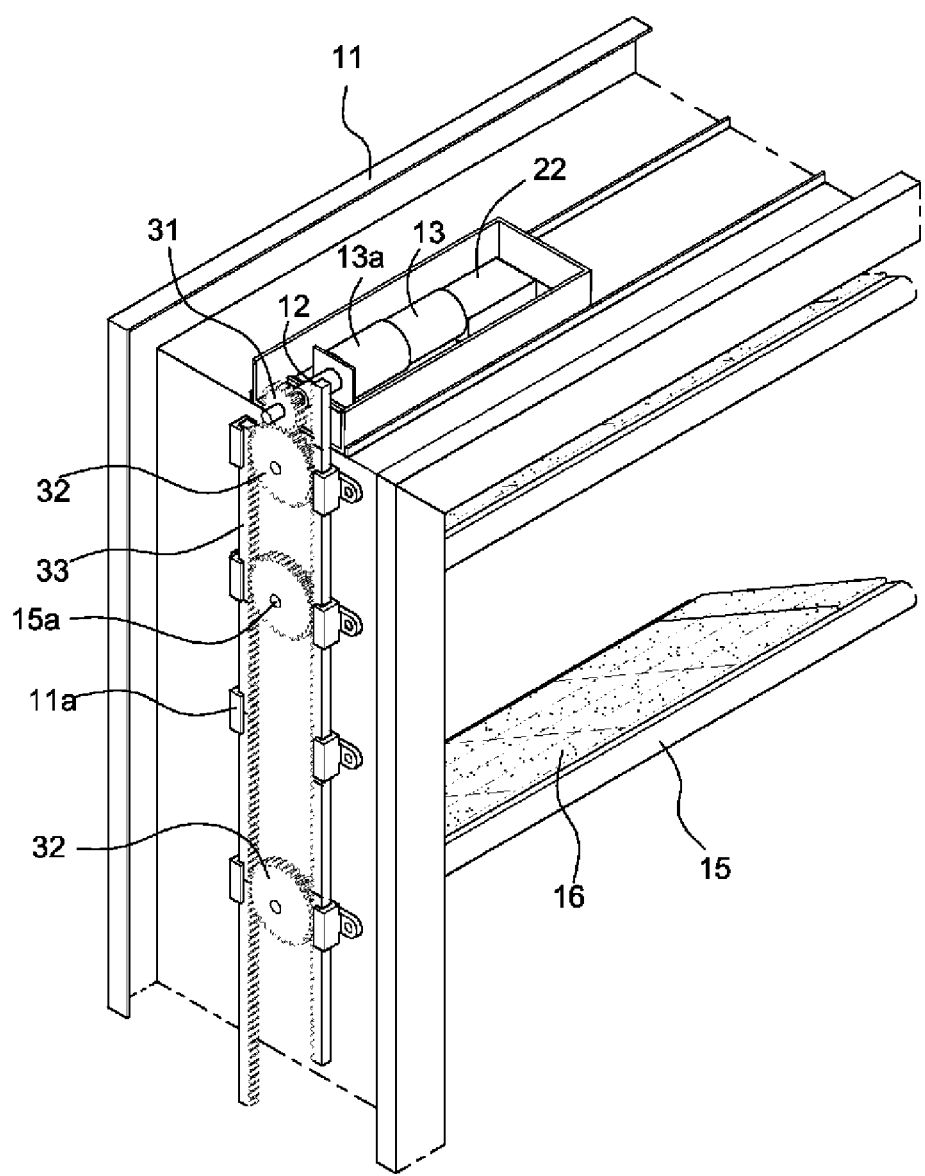
Figure 13:
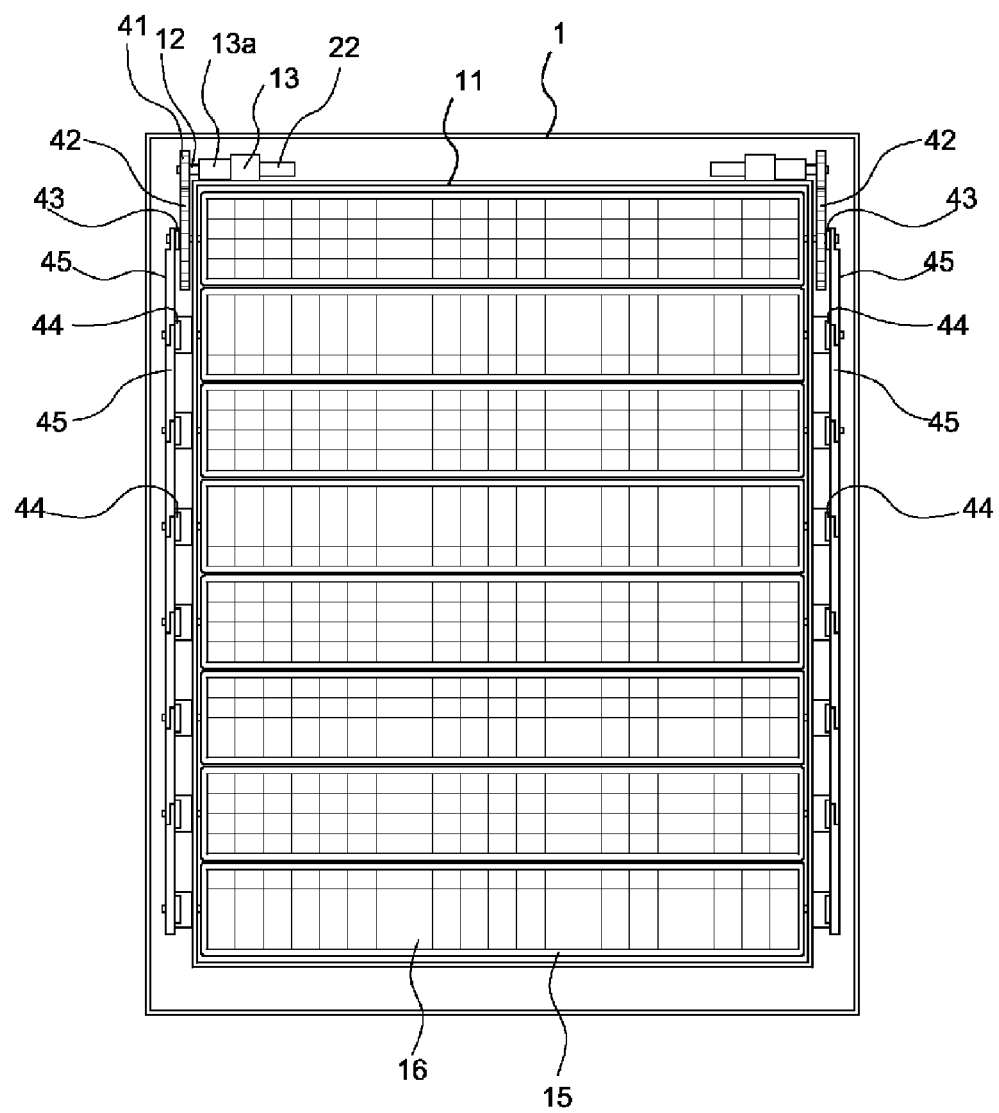
FIGS. 13 to 18 are perspective views showing other examples of the power transmission unit in the photovoltaic soundproof wall according to the present invention.
Figure 14:
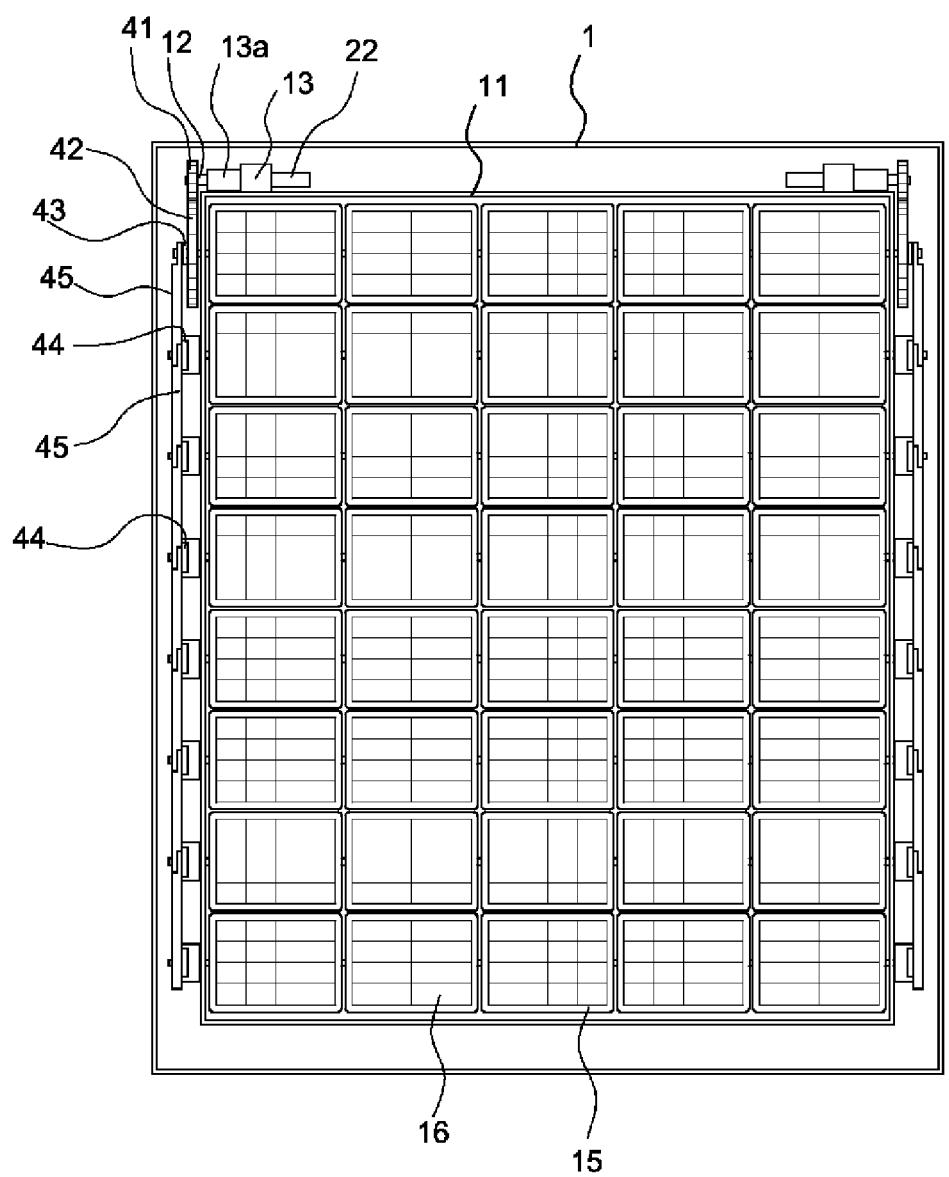
Figure 15:
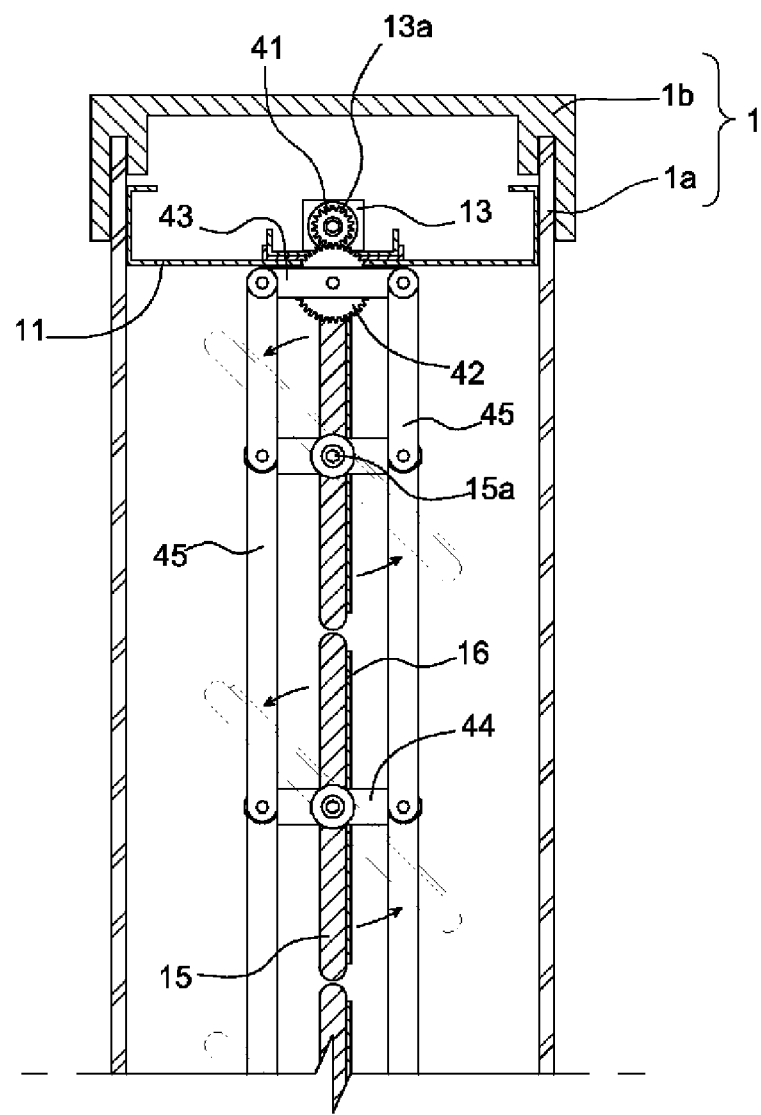
Figure 16:
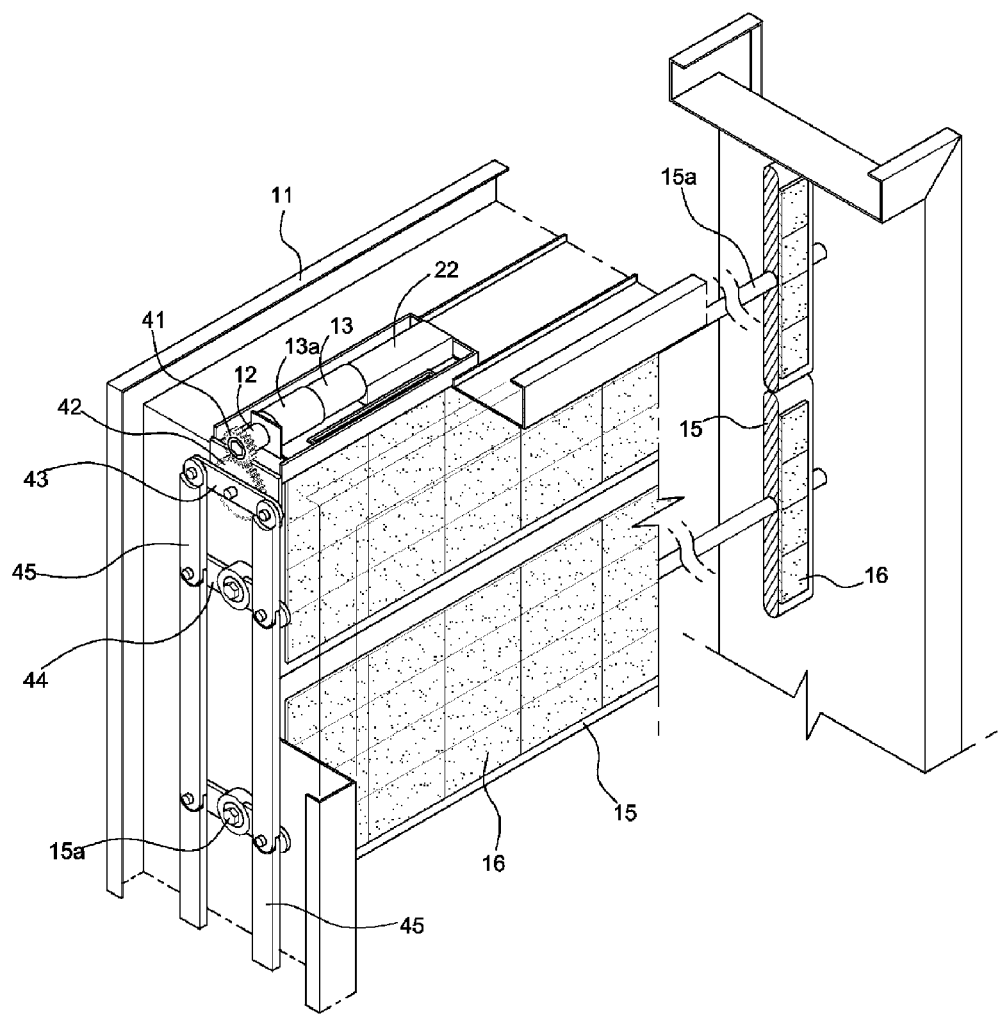
Figure 17:
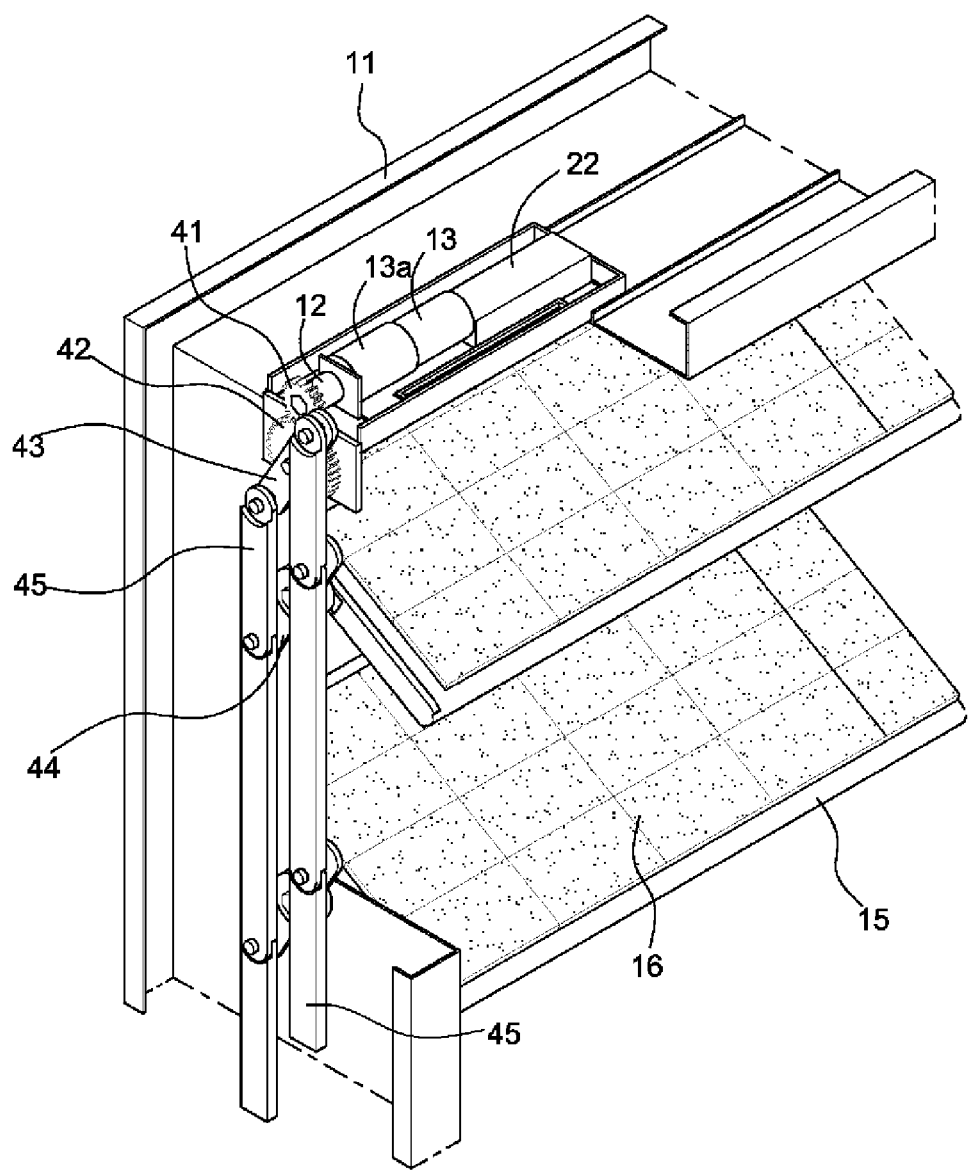
Figure 18:
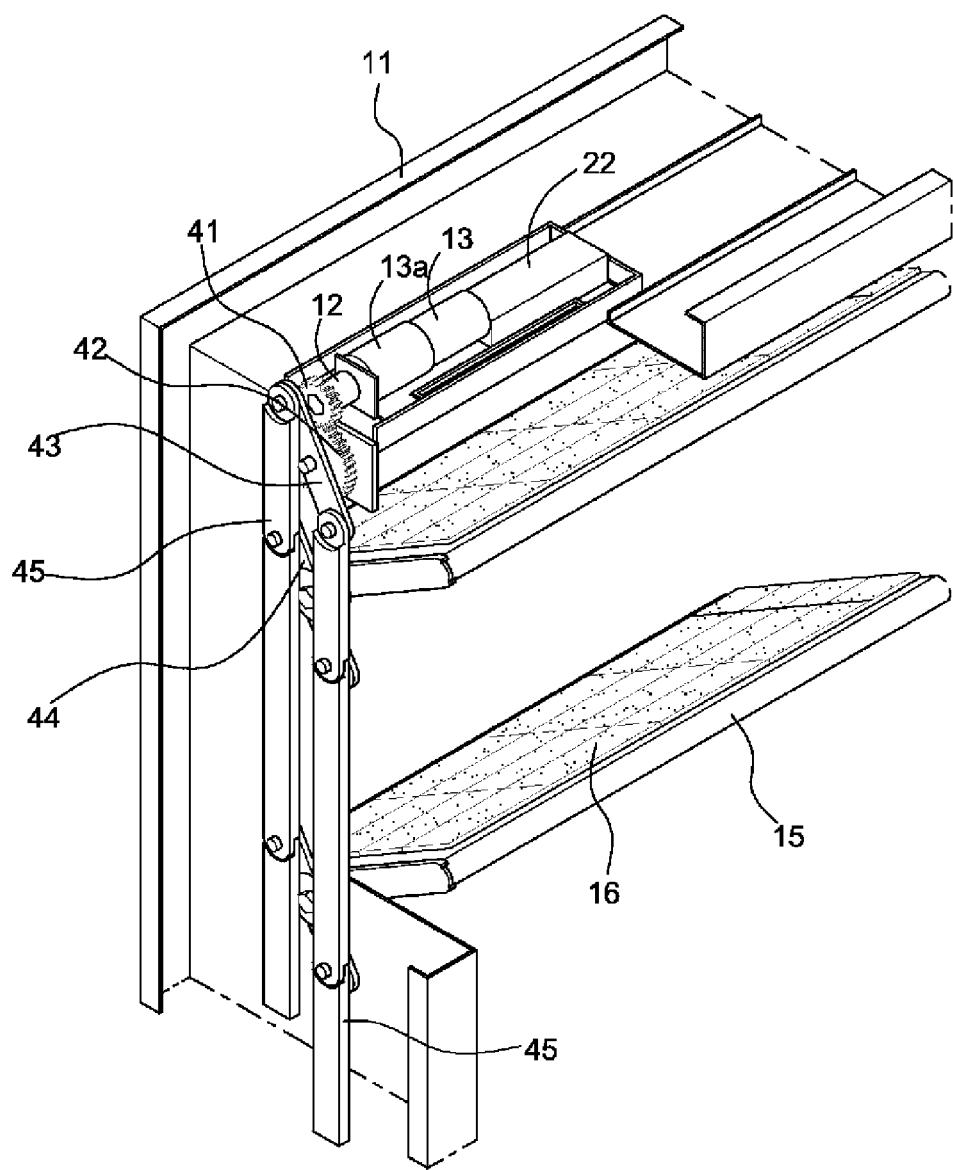

Like this, in the structure where the slat shafts 15a and the slats 15 are operated cooperatively with each other, the slats 15 are segmented as shown in FIGS. 8 and 14. If the slats are segmented, the plurality of slats 15 coupled along the slat shafts 15a can be easily adjusted in their whole sizes in accordance with the length of the slat shaft 15a.

With all of the power transmission units as mentioned above, the plurality of slats 15 is rotated by the motor 13, and electricity is easily generated in accordance with the angles of the solar cells 16 attached to the top surface of each slat 15.

As noted above, of course, the motor 13 is controlled by means of the controller 22 and the generation quantity-measuring sensor 21, and therefore, an explanation of them will be avoided.

On the other hand, the control for the positions of the slats 15 and the solar cells 16 is needed by time sequences in accordance with previously data-based information, without having any generation quantity-measuring sensor 21, and the moving tracks of the sun are changed in accordance with the installation position of the photovoltaic soundproof wall according to the present invention.

Figure 19:
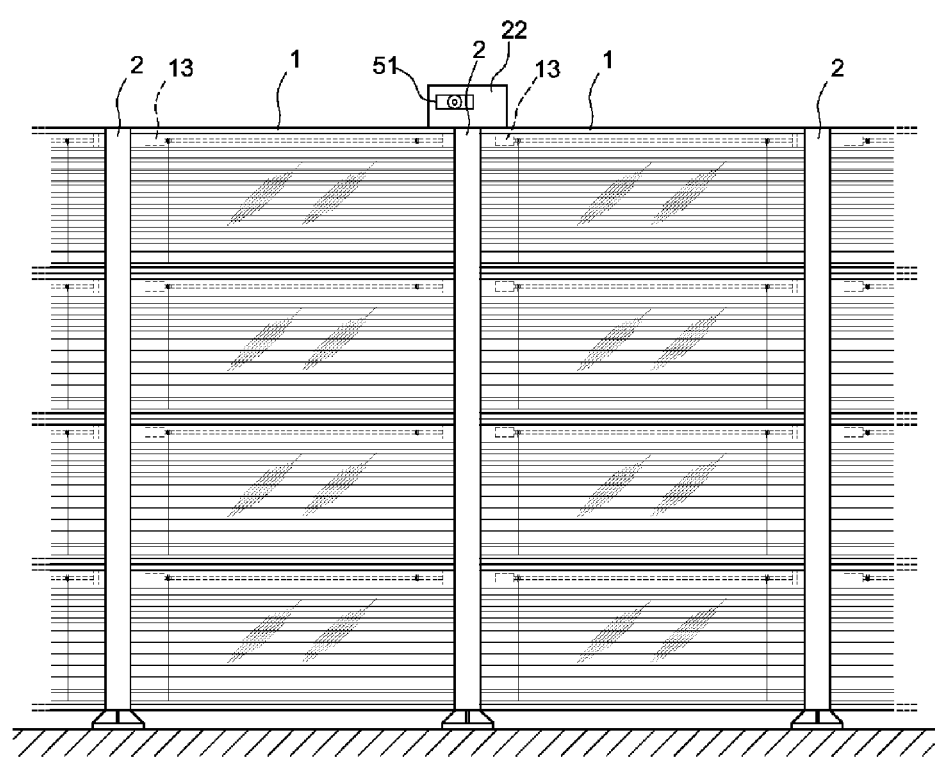
FIGS. 19 and 20 are perspective views showing a photovoltaic soundproof wall according to yet another embodiment of the present invention.
Figure 20:
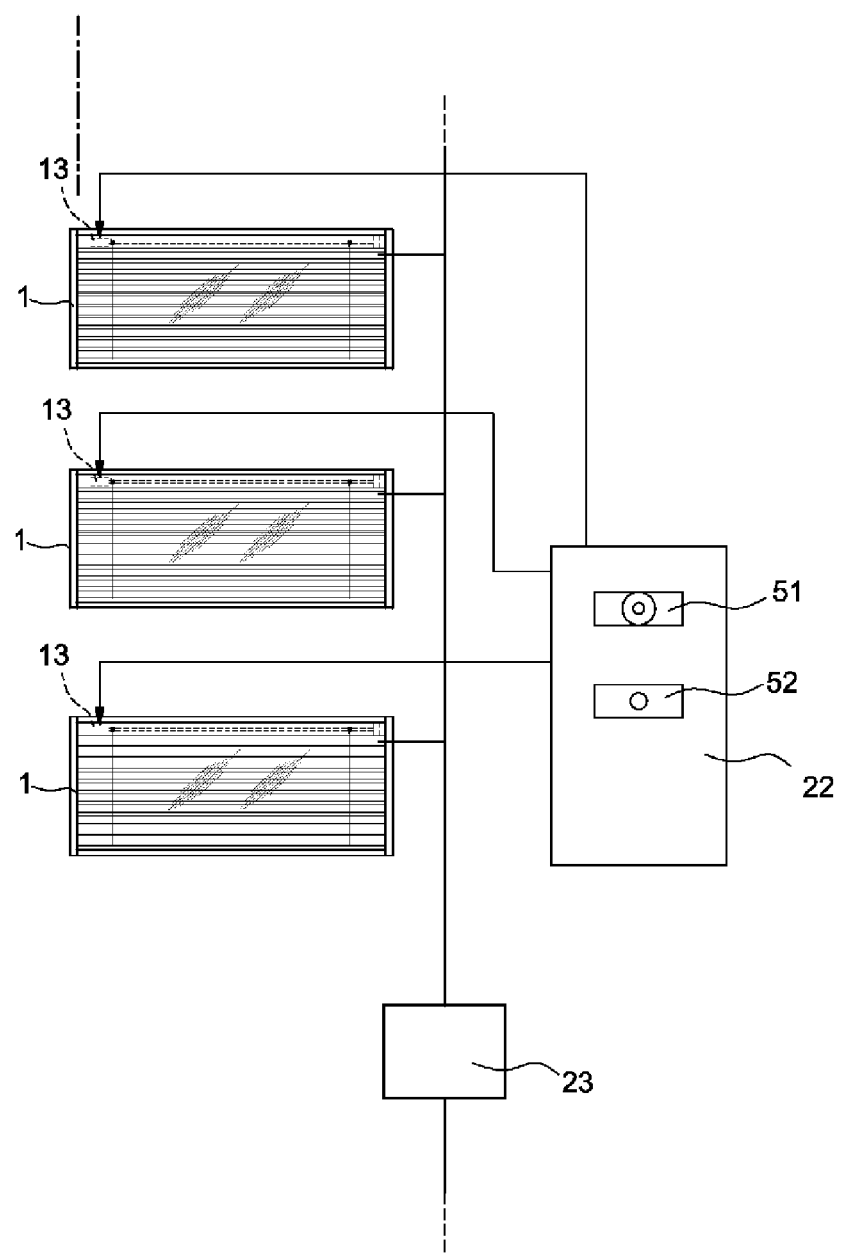

As shown in FIGS. 19 and 20, a plurality of azimuth angle sensors 51, which are adapted to sense the front positions and directions of the soundproof members 51, are mounted on the soundproof members 51, and the controller 22 calculates the moving tracks of the sun corresponding to the front positions and directions of the soundproof members 1 in accordance with the signals sensed by the azimuth angle sensors 51. The motor 2 is controlled by given time sequences by the controller 22, thereby allowing the positions of the slats 15 to be varied appropriately.

The photovoltaic soundproof wall according to the present invention further includes a light sensor 52 adapted to sense the brightness around the soundproof members 1, and as shown in FIG. 20, the azimuth angle sensor 51 and the light sensor 52 are formed integrally with the controller 22.

The azimuth angle sensor 51 is disposed on the same direction as a direction to which the soundproof member 1 is disposed on ground, thereby permitting the signal obtained by sensing the accurate position and direction of the disposed soundproof member 1 to be sent to the controller 22.

Next, the controller 22 receiving the signal of the azimuth angle sensor 51 recognizes the position and direction of the soundproof member 1 to control the motor 13 with the data on the moving tracks of the sun in accordance with the position and direction of the soundproof member 1, thereby varying the angles of the slats 15 by time sequences.

In other words, since the controller 22 has the data-based information on the tracks of the sun corresponding to the time sequences of the area on which the soundproof member 1 is installed in accordance with the azimuth angle of the earth, the controller 22 can recognize the positions of the sun moving by the time sequences in accordance with the installation position and direction of the soundproof member 1 and permit a maximum quantity of solar energy to be injected onto the solar cells 16 attached to the slats 15.

Since the soundproof members 1 arranged in the same direction as each other have the same azimuth angles as each other, one azimuth angle sensor 51 is installed thereon, but if the soundproof members 1 arranged in the different direction from each other, they have the different azimuth angles from each other. In the soundproof members 1 arranged in the different direction from each other, accordingly, the soundproof members 1 having the same direction as each other are collected with one azimuth angle sensor 51 installed thereon.

Since the motor 13 is activated by the programs stored in the controller 22, therefore, the inclinations of the slats 15 and the solar cells 16 are varied by means of the power transmission unit, thereby allowing the slats 15 and the solar cells 16 to be responded to the radiation angles of the solar energy varied in accordance with the installation area of the soundproof member 1, seasons and time sequences.

The light sensor 52 or an optical sensor senses the brightness around the soundproof members 1 by weather, and if it is dark around the soundproof members 1 on a sunset time or a cloudy day, the controller 22 is reset to an initial state, thereby preventing the consumption of electricity. On the other hand, if it is bright around the soundproof members 1 on a sunrise time, the controller 22 is activated to collect the solar energy from the solar cells 16.

According to the present invention, since the motor is controlled by the controller in accordance with the signals sensed by the generation quantity-measuring sensor, the positions of the slats to which the solar cells are attached to receive solar energy and to generate electricity therefrom are varied appropriately, thereby easily achieving the production of the electricity as well as noise soundproof.

Additionally, since the solar cells generating electricity are disposed in a space between the two transparent sheets, the decrease in the efficiency of the solar cells can be avoided by cleaning the transparent sheets only, thereby achieving the easiness of the maintenance thereof. Moreover, since no parts are protrudedly attached to the external surfaces of the photovoltaic soundproof wall, the parts for generation solar energy of the photovoltaic soundproof wall are easily not broken by rain storm or unexpected vehicle collision thereagainst.

Especially, since the motor is controlled by means of the controller to allow the angles of the slats to be varied by given time sequences in accordance with the azimuth angles sensed by the azimuth angle sensor, the data-based program where the tracks of the sun moving in accordance with the position and direction of the soundproof member are stored into the controller, such that the inclinations of the slats and the solar cells are efficiently adjusted by seasons, time sequences and the installation direction and area of the soundproof wall, in response to the signals sensed by the azimuth angle sensor.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A photovoltaic soundproof wall, comprising:
a plurality of soundproof members, each of the soundproof members including two transparent sheets and a main frame;
a plurality of posts installed on ground, the plurality of posts being equally spaced apart from one another for mounting the plurality of soundproof members therebetween;
a subframe disposed inside the main frame of each of the plurality of soundproof members;
at least one motor disposed inside the subframe;
a power transmission unit including at least two moving members configured to move by the activation of the at least one motor and transmit the rotary force of the at least one motor;
a plurality of slats vertically spaced apart from one another between the two transparent sheets, the plurality of slats being configured to collectively move by the power transmitted through the at least two moving members of the power transmission unit; and
a plurality of solar cells attached to top surfaces of the plurality of slats, respectively,
wherein the at least two moving members of the power transmission unit are disposed at both sides of the slats and the solar cells,
wherein the power transmission unit further includes:
at least one drive shaft rotated by the activation of the at least one motor;

at least one decelerator coupled to the at least one drive shaft to reduce the number of rotations of the at least one motor;

at least one drive gear mounted on an end portion of the at least one drive shaft;

at least one idle gear mounted on a top portion of a side surface of the subframe;

at least one main link mounted on the at least one idle gear;

a plurality of sublinks mounted on end portions of a plurality of slat shafts passing through centers of the plurality of slats, and wherein the at least two moving members comprise a plurality of vertical links coupled by means of hinges to both end portions of the at least one main link and both ends of the plurality of sublinks.

2. The photovoltaic soundproof wall according to claim 1, further comprising:
   a plurality of motors including the at least one motor, the plurality of motors being provided inside the soundproof members,
   a plurality of generation quantity-measuring sensors provided inside the plurality of soundproof members, and configured to sense quantities of electricity generated from the plurality of solar cells, and
   a plurality of controllers provided inside the plurality of soundproof members, and configured to adjust angles of the plurality of slats by controlling the plurality of motors.

3. The photovoltaic soundproof wall according to claim 2, wherein the plurality of controllers is configured to receive signals sensed by the plurality of generation quantity-measuring sensors to calculate maximum values of generation quantities, and control the plurality of motors in real time to adjust the angles of the plurality of slats in accordance with the calculated results.

4. The photovoltaic soundproof wall according to claim 2, wherein the plurality of controllers is configured to receive signals sensed by the generation quantity-measuring sensors to calculate maximum values of generation quantities by time sequences, and control plurality of the motors by the time sequences to adjust the angles of the plurality of slats in accordance with the calculated results.

5. The photovoltaic soundproof wall according to claim 1, further comprising:
   a plurality of motors including the at least one motor, the plurality of motors being provided inside the soundproof members,
   a generation quantity-measuring sensor adapted to sense quantities of electricity generated from all of the plurality of solar cells, and
   a controller adapted to control all of the plurality of motors, receive signals sensed by the generation quantity-measuring sensor, and collectively control the plurality of motors.

6. The photovoltaic soundproof wall according to claim 5, wherein the controller is configured to receive the signals sensed by the generation quantity-measuring sensor to calculate maximum values of generation quantities, and control the plurality of motors in real time to adjust angles of the plurality of slats in accordance with the calculated results.

7. The photovoltaic soundproof wall according to claim 5, wherein the controller is configured to receive the signals sensed by the generation quantity-measuring sensor to calculate maximum values of generation quantities by time sequences, and control the plurality of motors by the time sequences to adjust angles of the plurality of slats in accordance with the calculated results.

8. The photovoltaic soundproof wall according to claim 1, further comprising:
   a plurality of motors including the at least one motor, the plurality of motors being provided inside the soundproof members,
   a plurality of generation quantity-measuring sensors provided inside the plurality of soundproof members, and configured to sense quantities of electricity generated from the plurality of solar cells, and
   a controller adapted to receive signals sensed by the generation quantity-measuring sensors, and individually control the plurality of motors to adjust angles of the plurality of slats.

9. The photovoltaic soundproof wall according to claim 8, wherein the controller is configured to receive the signals sensed by the plurality of generation quantity-measuring sensors to calculate maximum values of generation quantities, and control the plurality of motors in real time to adjust the angles of the plurality of slats in accordance with the calculated results.

10. The photovoltaic soundproof wall according to claim 8, wherein the controller is configured to receive the signals sensed by the generation quantity-measuring sensors to calculate maximum values of generation quantities by time sequences, and control the plurality of motors by the time sequences to adjust the angles of the plurality of slats in accordance with the calculated results.

11. The photovoltaic soundproof wall according to claim 1, further comprising:
    an azimuth angle sensor mounted on the plurality of soundproof members to sense front positions and directions of the plurality of soundproof members, and
    a controller adapted to calculate moving tracks of the sun corresponding to the front positions and directions of the plurality of soundproof members in accordance with signals sensed by the azimuth angle sensor, and control the at least one motor by given time sequences to adjust positions of the plurality of slats.

12. The photovoltaic soundproof wall according to claim 11, further comprising a light sensor adapted to sense brightness around the plurality of soundproof members.

13. The photovoltaic soundproof wall according to claim 12, wherein the azimuth angle sensor and the light sensor are formed integrally with the controller.

14. The photovoltaic soundproof wall according to claim 1, further comprising an inverter adapted to convert direct current produced from the plurality of solar cells into alternating current, and supply the alternating current to an electrical and electronic equipment installed on the photovoltaic soundproof wall or at the outside of the photovoltaic soundproof wall.

15. The photovoltaic soundproof wall according to claim 1, further comprising an inverter adapted to convert direct current produced from the plurality of solar cells into alternating current, and supply the alternating current to an electric power system.

16. The photovoltaic soundproof wall according to claim 1, further comprising:
    a plurality of motors including the at least one motor, the plurality of motors being provided inside the soundproof members, and
    a controller configured to control the plurality of motors provided inside the plurality of soundproof members, individually or collectively, in accordance with a data-based program on optimal angles of the plurality of solar cells, and adjust angles of the plurality of solar cells.

17. The photovoltaic soundproof wall according to claim 1, wherein the power transmission unit further includes:
- a drive shaft rotated by the activation of the motor; and
- a plurality of drums spaced apart from each other around the drive shaft,
- wherein the at least two moving members comprises a plurality of slat drive cords having top end portions being wound on or unwound from the plurality of drums, the plurality of slat drive cords being configured to support the plurality of slats, collectively move the plurality of slats, and rotate the plurality of slats to be moved in forward and backward directions.

18. A photovoltaic soundproof wall, comprising:
- a plurality of soundproof members, each of the soundproof members including two transparent sheets and a main frame;
- a plurality of posts installed on ground, the plurality of posts being equally spaced apart from one another for mounting the plurality of soundproof members therebetween;
- a subframe disposed inside the main frame of each of the plurality of soundproof members;
- at least one motor disposed inside the subframe;
- a power transmission unit including at least two moving members configured to move by the activation of the at least one motor and transmit the rotary force of the at least one motor;
- a plurality of slats vertically spaced apart from one another between the two transparent sheets, the plurality of slats being configured to collectively move by the power transmitted through the at least two moving members of the power transmission unit; and
- a plurality of solar cells attached to top surfaces of the plurality of slats, respectively,
- wherein the at least two moving members of the power transmission unit are disposed at both sides of the slats and the solar cells,
- wherein the power transmission unit further includes:
- at least one drive shaft rotated by the activation of the at least one motor;
- at least one decelerator coupled to the at least one drive shaft to reduce the number of rotations of the at least one motor;
- at least one pinion gear mounted on an end portion of the at least one drive shaft;
- a plurality of driven gears arranged along a side surface of the subframe, and mounted on end portions of a plurality of slat shafts passing through centers of the plurality of slats; and
- a plurality of guides mounted along the side surface of the subframe to guide vertical movements of the at least two moving members, and
- wherein the at least two moving members comprise two rack gears engaging with the at least one pinion gear and the plurality of driven gears, and the pinion gear and the plurality of driven gears are placed between the two rack gears.

* * * * *